United States Patent
Bono et al.

(10) Patent No.: US 10,985,390 B2
(45) Date of Patent: Apr. 20, 2021

(54) FUEL CELL SYSTEM AND CONTROL METHOD OF FUEL CELL SYSTEM

(71) Applicant: TOYOTA JIDOSHA KABUSHIKI KAISHA, Toyota (JP)

(72) Inventors: Tetsuya Bono, Miyoshi (JP); Toshihiro Egawa, Okazaki (JP); Masahiro Okuyoshi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 115 days.

(21) Appl. No.: 16/287,500

(22) Filed: Feb. 27, 2019

(65) Prior Publication Data

US 2019/0288313 A1   Sep. 19, 2019

(30) Foreign Application Priority Data

Mar. 19, 2018   (JP) ............................... JP2018-50708

(51) Int. Cl.
*H01M 8/04746* (2016.01)
*H01M 8/0438* (2016.01)
(Continued)

(52) U.S. Cl.
CPC ... *H01M 8/04753* (2013.01); *H01M 8/04164* (2013.01); *H01M 8/04388* (2013.01);
(Continued)

(58) Field of Classification Search
CPC .......... H01M 8/0473; H01M 8/04164; H01M 8/04388; H01M 8/04447; H01M 8/04492; H01M 8/04843
See application file for complete search history.

(56) References Cited

U.S. PATENT DOCUMENTS

2009/0029226 A1* 1/2009 Yamagishi .............. B60L 58/30
                                                                    429/414
2009/0081492 A1* 3/2009 Hasuka ............. H01M 8/04686
                                                                    429/429

FOREIGN PATENT DOCUMENTS

JP        2008-016349       1/2008
JP        2008016349    *   1/2008

* cited by examiner

*Primary Examiner* — Jayne L Mershon
(74) *Attorney, Agent, or Firm* — Finnegan, Henderson, Farabow, Garrett & Dunner, LLP (57) ABSTRACT

Provided is a fuel cell system including: a fuel cell; an anode gas supply device; a pressure sensor; a discharge valve; an estimation unit that estimates an anode gas concentration; and a control unit. The control unit performs first control of opening the discharge valve when a first valve opening condition is established in which the estimated anode gas concentration is equal to or lower than a first concentration, and closing the discharge valve when a first valve closing condition is established in which the estimated anode gas concentration is equal to or higher than a second concentration higher than the first concentration, and performs second control of closing the discharge valve when a deviation between the target pressure value and a value of the pressure sensor is continuously equal to or larger than a predetermined threshold for a predetermined period, and opening the discharge value when a second valve opening condition is established in which the estimated anode gas concentration is equal to or lower than a third concentration lower than the first concentration, or in which a value obtained by multiplying the estimated anode gas concentration by a predetermined coefficient so that the anode gas concentration is estimated to be high is equal to or lower than the first concentration.

2 Claims, 4 Drawing Sheets

(51) Int. Cl.
*H01M 8/0444* (2016.01)
*H01M 8/04119* (2016.01)
*H01M 8/04492* (2016.01)
*H01M 8/04828* (2016.01)

(52) U.S. Cl.
CPC ... *H01M 8/04447* (2013.01); *H01M 8/04492* (2013.01); *H01M 8/04843* (2013.01); *H01M 2250/20* (2013.01)

FUEL CELL SYSTEM AND CONTROL METHOD OF FUEL CELL SYSTEM

CROSS REFERENCE TO RELATED APPLICATION

The present application claims priority to Japanese Patent Application No. 2018-50708 filed on Mar. 19, 2018 and the entire disclosure of which is incorporated herein by reference.

BACKGROUND

Field

The present disclosure relates to a fuel cell system and a control method of the fuel cell system.

Related Art

JP 2008-16349 A discloses s fuel cell system including: a fuel cell; a supply flow path of anode gas supplied from a high pressure tank; an injector provided in the supply flow path; a discharge flow path of anode off-gas discharged from the fuel cell; and an exhaust and drain valve provided in the discharge flow path. The exhaust and drain valve is operated by a command from a control unit, and discharges anode off-gas containing water and impurities to the outside.

Patent Literature 1: JP 2008-16349 A

A technology further reducing an amount of anode gas discharged from an exhaust and drain valve in a fuel cell system has been desired.

SUMMARY

According to a first aspect of the present disclosure, a fuel cell system is provided. This fuel cell system is a fuel system including: a fuel cell; an anode gas supply device provided in a supply flow path that supplies anode gas to the fuel cell; a pressure sensor that measures a pressure value of the supply flow path in a downstream of the anode gas supply device; a discharge valve provided in a discharge flow path through which anode off-gas is discharged from the fuel cell; an estimation unit configured to estimate an anode gas concentration of the supply flow path in the downstream of the anode gas supply device, using an anode gas supply amount by the anode gas supply device and a discharge amount of the anode off-gas obtained by using a valve opening time of the discharge valve; and a control unit configured to perform opening and closing of the discharge valve and controlling the anode gas supply device such that a value measured by the pressure sensor is a target pressure value, and in the fuel cell system, the control unit configured to perform first control of opening the discharge valve when a first valve opening condition is established in which the anode gas concentration estimated by the estimation unit is equal to or lower than a first concentration, and closing the discharge valve when a first valve closing condition is established in which the estimated anode gas concentration is equal to or higher than a second concentration higher than the first concentration, and the control unit configured to perform second control of closing the discharge valve when a deviation between the target pressure value and a value of the pressure sensor is continuously equal to or larger than a predetermined threshold for a predetermined period, and opening the discharge value when a second valve opening condition is established in which the estimated anode gas concentration is equal to or lower than a third concentration lower than the first concentration, or a value obtained by multiplying the estimated anode gas concentration by a predetermined coefficient so that the anode gas concentration is estimated to be high is equal to or lower than the first concentration.

According to a second aspect of the present disclosure, a control method of a fuel cell system is provided. This method is a method including: estimating an anode gas concentration of a supply flow path in a downstream of an anode gas supply device provided in the supply flow path that supplies anode gas to a fuel cell by using an anode gas supply amount by the anode gas supply device and a discharge amount of anode off-gas determined by using a valve opening time of a discharge valve provided in a discharge flow path through which the anode off-gas is discharged from the fuel cell; controlling the anode gas supply device such that a pressure value of the supply flow path in the downstream of the anode gas supply device is a target pressure value; performing first control of opening the discharge valve when a first opening condition is established in which the estimated anode gas concentration is equal to or lower than a first concentration, and closing the discharge valve when a first valve closing condition is established in which the estimated anode gas concentration is equal to or higher than a second concentration higher than the first concentration; and performing second control of closing the discharge valve when a deviation between the target pressure value and the pressure value of the supply flow path in the downstream of the anode gas supply device is continuously equal to or larger than a predetermined threshold for a predetermined period, and opening the discharge valve when a second valve opening condition is established in which the estimated anode gas concentration is equal to or lower than a third concentration lower than the first concentration, or a value obtained by multiplying the estimated anode gas concentration by a predetermined coefficient so that the anode gas concentration is estimated to be high is equal to or lower than the first concentration.

DETAILED DESCRIPTION

First Embodiment

Figure 1:
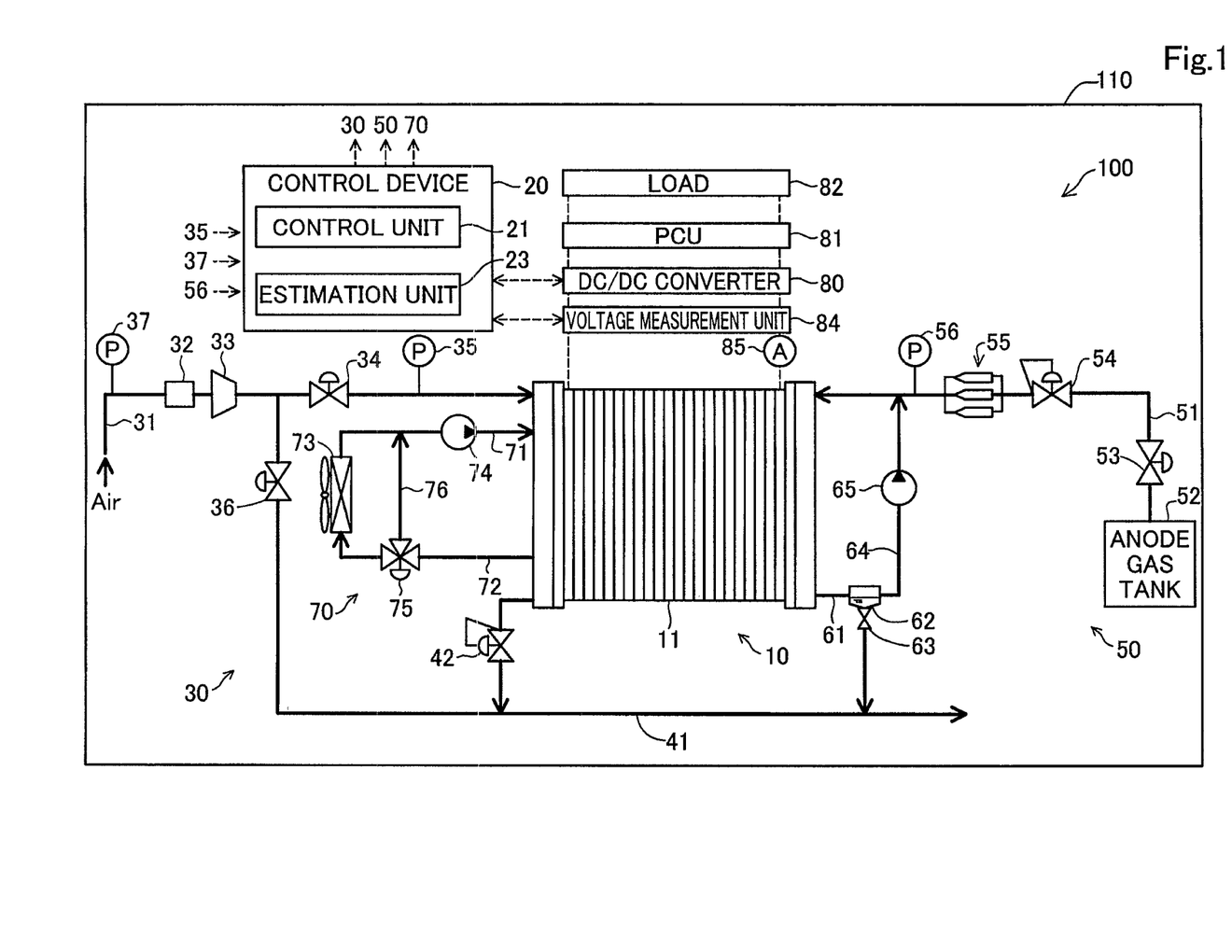
FIG. 1 is a diagram showing a schematic configuration of a fuel cell system.

FIG. 1 is a diagram showing a schematic configuration of a fuel cell system 100. The fuel cell system 100 is equipped in a vehicle 110 and outputs electric power serving as a power source of the vehicle 110 in response to a request from a driver.

The fuel cell system 100 includes a fuel cell stack 10, a control device 20, a cathode gas supply unit 30, an anode gas supply unit 50, a cooling medium circulation unit 70, a DC/DC converter 80, a power control unit (hereinafter, referred to as a "PCU") 81, and a load 82. The control device 20 is one or more ECUs including a CPU, a memory, and an interface, decompresses a program stored in the memory, and executes the program to function as a control unit 21 and an estimation unit 23.

The fuel cell stack 10 is composed of fuel cells 11 being stacked. Each of the fuel cells 11 has: a membrane electrode assembly having an electrolyte membrane, and an anode side electrode and a cathode side electrode disposed in each surface of the electrolyte membrane; and a set of separators clamping the membrane electrode assembly. The fuel cells 11 receive supply of anode gas (for example, hydrogen) and cathode gas (for example, air) as reactant gas to generate power.

The cathode gas supply unit 30 includes a cathode gas piping 31, an atmospheric pressure sensor 37, an air flow meter 32, a cathode gas compressor 33, a first opening and closing valve 34, a cathode pressure sensor 35, a flow divider valve 36, a cathode off-gas piping 41, and a first regulator 42.

The atmospheric pressure sensor 37 is provided in the cathode gas piping 31, and measures an inlet pressure of the cathode gas piping 31 to measure the atmospheric pressure. The air flow meter 32 is provided in the cathode gas piping 31, and measures a flow rate of intake air. The cathode gas compressor 33 is connected with the fuel cell stack 10 via the cathode gas piping 31. The cathode gas compressor 33 compresses the cathode gas taken in from the outside to supply the compressed gas to the fuel cell stack 10, by control by the control unit 21.

The first opening and closing valve 34 is provided between the cathode gas compressor 33 and the fuel cell stack 10, and opens and closes by control by the control unit 21. The cathode pressure sensor 35 measures a pressure of a cathode gas inlet of the fuel cell stack 10. The flow divider valve 36 is provided between the cathode gas compressor 33 and the cathode off-gas piping 41, and adjusts a flow rate of air to the fuel cell stack 10 and the cathode off-gas piping 41, by control by the control unit 21.

The cathode off-gas piping 41 discharges cathode off-gas discharged from the fuel cell stack 10 to the outside of the fuel cell system 100. The first regulator 42 adjusts a pressure of a cathode gas outlet of the fuel cell stack 10 by control by the control unit 21.

The anode gas supply unit 50 includes an anode gas piping 51, an anode gas tank 52, a second opening and closing valve 53, a second regulator 54, an injector 55, an anode pressure sensor 56, an anode off-gas piping 61, a gas and liquid separation device 62, a discharge valve 63, a circulation piping 64, and an anode gas pump 65.

The anode gas piping 51 is a supply flow path for supplying anode gas to the fuel cell stack 10. The anode gas tank 52 is connected with an anode gas inlet manifold of the fuel cell stack 10 via the anode gas piping 51, and supplies anode gas filled in the inside to the fuel cell stack 10. The second opening and closing valve 53, the second regulator 54, and the injector 55 are provided from an upstream side, that is, a closer side to the anode gas tank 52, in this order in the anode gas piping 51. The second opening and closing valve 53 opens and closes by control by the control unit 21. The second regulator 54 adjusts the pressure of the anode gas in the upstream side of the injector 55 by control by the control unit 21.

The anode pressure sensor 56 is provided in the downstream side from the injector 55 of the anode gas piping 51. In the present embodiment, the anode pressure sensor 56 is provided in the downstream side from the injector 55 of the anode gas piping 51, and in the upstream side from a connection position with the circulation piping 64. The anode pressure sensor 56 measures a pressure value in the downstream of the injector 55. The anode pressure sensor 56 may be provided in the downstream from the connection position with the circulation piping 64 in the anode gas piping 51.

The injector 55 is an opening and closing valve that drives electromagnetically in accordance with a drive cycle and a valve opening time set by the control unit 21, and adjusts an anode gas supply amount supplied to the fuel cell stack 10. The injector 55 is also referred to as an "anode gas supply device". In the present embodiment, the injector 55 is provided in plural in the anode gas piping 51. The control unit 21 controls the drive cycle and the valve opening time of the injector 55 such that the measurement value of the anode pressure sensor 56 does not fall below a target pressure value, and controls the anode gas supply amount to the fuel cell stack 10. The target pressure value is determined in accordance with requested electric power to the fuel cell stack 10. Note that the injector 55 and the second regulator 54 that adjusts the pressure of the anode gas in the upstream side of the injector 55 can be also collectively referred to as an "anode gas supply device".

The anode off-gas piping 61 connects the anode off-gas outlet manifold of the fuel cell stack 10 and the gas and liquid separation device 62. The anode off-gas piping 61 is a discharge flow path for discharging the anode off-gas from the fuel cell stack 10, and guides the anode off-gas containing anode gas and nitrogen gas that have not been used for power generation, to the gas and liquid separation device 62.

The gas and liquid separation device 62 is connected between the anode off-gas piping 61 and the circulation piping 64. The gas and liquid separation device 62 separates water as an impurity from the anode off-gas discharged from the fuel cell stack 10, and stores the water.

The discharge valve 63 is an opening and closing valve provided in the anode off-gas piping 61, and provided in vertically downward of the gas and liquid separation device 62. The discharge valve 63 opens and closes by control by the control unit 21. When the discharge valve 63 is opened, subsequently to the water in the gas and liquid separation device 62, the anode off-gas is discharged from the discharge valve 63. In the present embodiment, the discharge valve 63 is connected to the cathode off-gas piping 41, and the discharged water and the anode off-gas are discharged to the outside through the cathode off-gas piping 41. When the discharge valve 63 is closed, the anode gas is consumed for power generation, while impurities (for example, nitrogen that has permeated from the cathode side to the anode side) other than the anode gas are not consumed. Thus, the concentration of impurities in the anode off-gas gradually increases. At this time, upon opening of the discharge valve 63, the anode off gas is discharged to the outside of the fuel cell system 100 together with the cathode off-gas. Even during opening of the discharge valve 63, the supply of the anode gas by the injector 55 continues so that the anode gas concentration in the downstream of the injector 55 gradually increases.

The circulation piping 64 is connected to a portion in the downstream in the anode gas piping 51 from the injector 55. An anode gas pump 65 is provided in the circulation piping 64. The anode gas pump 65 is driven by control by the control unit 21, and sends out the anode off-gas from which water is separated by the gas and liquid separation device 62, to the anode gas piping 51. In this fuel cell system 100, the anode off-gas containing the anode gas is circulated and supplied again to the fuel cell stack 10, so that the utilization efficiency of the anode gas is improved.

The cooling medium circulation unit 70 includes a cooling medium supply pipe 71, a cooling medium discharge pipe 72, a radiator 73, a cooling medium pump 74, a three-way valve 75, and a bypass pipe 76. The cooling medium circulation unit 70 circulates a cooling medium in the fuel cell stack 10 to adjust temperature of the fuel cell stack 10. As the cooling medium, for example, water, non-freezing water such as ethylene glycol, or air is used.

The cooling medium supply pipe 71 is connected to a cooling medium inlet in the fuel cell stack 10, and the cooling medium discharge pipe 72 is connected to the cooling medium outlet of the fuel cell stack 10. The radiator 73 is connected to the cooling medium discharge pipe 72 and the cooling medium supply pipe 71, cools the cooling medium flown in from the cooling medium discharge pipe 72 by air blown by an electric fan or the like, and then, discharges the cooled cooling medium to the cooling medium supply pipe 71. The cooling medium pump 74 is provided in the cooling medium supply pipe 71, and pressurizes and sends the cooling medium to the fuel cell stack 10. The three-way valve 75 adjusts a flow rate of the cooling medium to the radiator 73 and the bypass pipe 76 in accordance with a control signal of the control unit 21.

A DC/DC converter 80 increases an output voltage of the fuel cell stack 10 and supplies the increased voltage to a PCU 81. The PCU 81 incorporates an inverter and supplies electric power to the load 82 via the inverter in accordance with the control signal of the control unit 21. Electric power of the fuel cell stack 10 and a secondary cell not shown is supplied to the load 82 of a traction motor (not shown) for driving wheels (not shown) or the like, the cathode gas compressor 33, the anode gas pump 65, and various valves, via a power supply circuit including the PCU 81.

An electric current sensor 85 measures an output current of the fuel cell stack 10. A voltage measurement unit 84 measures the voltage of the fuel cell stack 10. In the present embodiment, the voltage measurement unit 84 calculates an average cell voltage from the voltage of the fuel cell stack 10. The "average cell voltage" is a value obtained by dividing the voltage of both ends of the fuel cell stack 10 by the number of the fuel cells 11.

The control unit 21 controls each unit of the fuel cell system 100 in accordance with the requested electric power, and controls output of the fuel cell stack 10. The requested electric power includes an external power generation request by a driver of the vehicle 110 equipped with the fuel cell system 100, or the like, and an internal power generation request for supplying electric power to auxiliary machines of the fuel cell system 100. The external power generation request increases as a pressing amount of an accelerator pedal not shown of the vehicle 110 increases.

The control unit 21 realizes discharge valve opening and closing processing of controlling opening and closing of the discharge valve 63 by using an estimation result of the estimation unit 23.

The estimation unit 23 estimates an anode gas concentration in the downstream of the injector 55 and a water amount in the gas and liquid separation device 62 by acquiring measurement results of each sensor, control command values of each unit of the fuel cell system 100 by the control unit 21 such as, for example, a valve opening time of the discharge valve 63 or a valve opening time of the injector 55.

The estimation unit 23 estimates the anode gas concentration by using an element increasing the anode gas concentration in the downstream of the injector 55, and an element decreasing the anode gas concentration. The element increasing the anode gas concentration is supply of the anode gas by the injector 55. The element decreasing the anode gas concentration is consumption of the anode gas by power generation of the fuel cell stack 10, crossover of the anode gas and impurities (for example, nitrogen gas or water), or discharge of the anode off-gas from the discharge valve 63. The "crossover" means moving of, for example, the anode gas and impurities from the anode to the cathode or from the cathode to the anode by permeating through the electrolyte membrane.

The supply amount of the anode gas by the injector 55 can be estimated from the anode gas supply amount per a time of the injector 55, a valve opening time, or the number of driving pieces of the injector 55, or the like. The consumption amount by the power generation reaction can be estimated from a voltage value and an output current value of the fuel cell stack 10. A crossover amount of the anode gas can be estimated from the supply amount of the anode gas, and a differential pressure between the anode pressure sensor 56 and the cathode pressure sensor 35. The crossover amount of the nitrogen gas can be estimated from the supply amount of the cathode gas, the amount of impurities in the cathode gas, and the differential pressure described above. The discharge amount from the discharge valve 63 can be estimated by determining in advance a relationship of the anode off-gas discharge amount per an opening time of the discharge valve 63 and a differential pressure between the anode pressure sensor 56 and the atmospheric pressure sensor 37, and inputting a valve opening time from when the water in the gas and liquid separation device 62 is discharged, and the differential pressure described above, in the determined relationship described above.

The fact that the water in the gas and liquid separation device 62 has been discharged can be estimated by, for example, determining in advance a water discharge amount per a valve opening time of the discharge valve 63, and from elapsing of the time when the estimated water amount in the gas and liquid separation device 62 is discharged after the discharge valve 63 is opened.

The estimation unit 23 estimates the water amount in the gas and liquid separation device 62 by using an element of increasing the water amount in the gas and liquid separation device 62, and an element of decreasing the water amount. The element increasing the water amount in the gas and liquid separation device 62 is crossover of water generated by the power generation reaction. The crossover amount of water can be estimated by using the power generation amount of the fuel cell stack 10, and for example, can be estimated from the amount of generated water estimated from the power generation current value, the water amount carried by the cathode gas to the anode estimated from the pressure value of the cathode pressure sensor 35, the water amount carried by the anode gas to the cathode estimated from the pressure value of the anode pressure sensor 56, the water amount by diffusion via the electrolyte membrane, and the water amount associated with proton movement between the anode and the cathode. The discharge amount from the discharge valve 63 can be estimated from the water discharge amount per a valve opening time of the discharge valve 63 and a valve opening time of the discharge valve 63.

The estimation unit 23 performs various estimation described above on the basis of the power generation state of the fuel cell stack 10 in the case where the fuel cell stack 10 is performing non-high load power generation different from the high load power generation. Here, the high load power generation is power generation in which the current density of the output current of the fuel cell stack 10 exceeds a predetermined value, and is power generation performed close to the upper limit of the output of the fuel cell stack 10, that is, for example, when the output upper limit is set to 100%, the power generation is performed by 95 to 100%. For example, when the pressing amount of the accelerator pedal of the vehicle 110 is the maximum, the high load power generation is performed.

Figure 2:
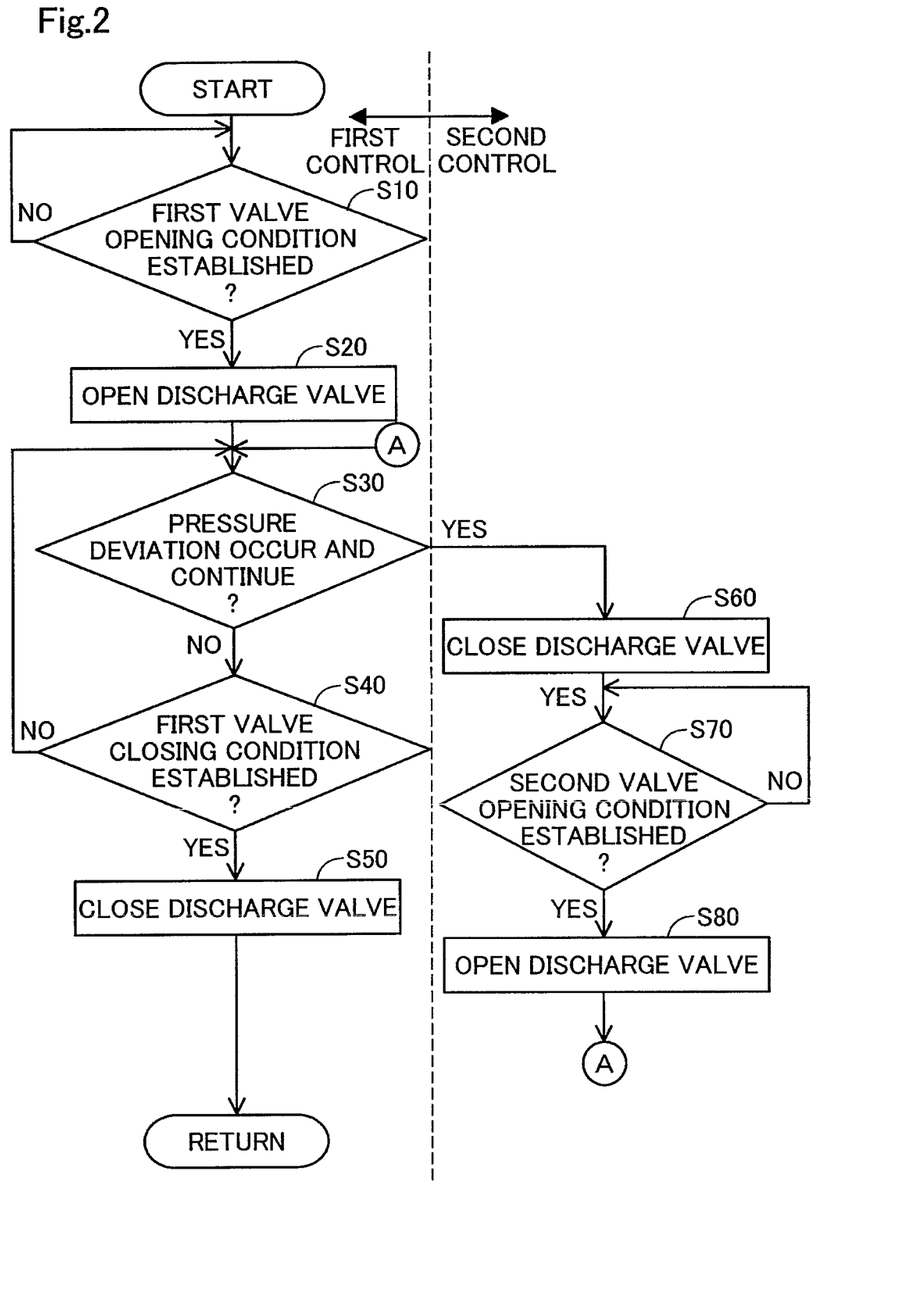
FIG. 2 is a process diagram showing opening and closing processing of a discharge valve.

FIG. 2 is a process diagram showing opening and closing processing of the discharge valve 63. The control unit 21 uses the estimation result of the estimation unit 23 to perform opening and closing processing. This processing is started at the time of starting of the fuel cell system 100. At the time of start of the opening and closing processing, the discharge valve 63 is closed.

The estimation unit 23 repeats the estimation described above in each predetermined time, in the opening and closing processing. The control unit 21 calculates a pressure deviation between the target pressure value and the value of the anode pressure sensor 56 in each predetermined time, in this processing.

Upon starting the opening and closing processing, first, the control unit 21 determines whether a first valve opening condition is established in which the anode gas concentration estimated by the estimation unit 23 is equal to or lower than the first concentration (step S10). The first concentration is determined on the basis of the anode gas concentration necessary when the fuel cell system 100 is performing non-high load power generation. The first concentration is concentration that is 1.3 times or more and 1.5 times or less the anode gas concentration theoretically necessary, in order to proceed the fuel cell reaction. The ratio of the anode gas concentration necessary in the fuel cell system 100 with respect to the anode gas concentration theoretically necessary is also referred to as a "necessary anode gas stoichiometric ratio". For example, each fuel cell 11 is normally wet, and the water content varies between the fuel cells 11, so that the pressure loss also varies between the fuel cells 11. Thus, the anode gas supply is requested with higher anode gas concentration than theoretically necessary, in order to supply the anode gas to each fuel cell 11, and this is why the necessary anode gas stoichiometric ratio is larger than 1.

When the first valve opening condition is not established (No at step S10), the control unit 21 maintains closing of the discharge valve 63.

When the first valve opening condition is established (YES at step S10), the control unit 21 opens the discharge valve 63 (step S20). When the discharge valve 63 is opened, the water in the gas and liquid separation device 62 is discharged from the discharge valve 63, and subsequently, the anode off-gas is discharged. Even during opening of the discharge valve 63, the anode gas supply by the injector 55 is performed, so that the anode gas concentration in the downstream of the injector 55 gradually increases.

The control unit 21 determines whether the pressure deviation equal to or larger than a predetermined first threshold continues for a predetermined first period (step S30). The first threshold and the first period are a threshold and a period for determining whether an anode gas shortage state has occurred in the fuel cell system 100. The "anode gas shortage state" is a state in which the supply amount of the anode gas by the anode gas supply device is insufficient with respect to the supply amount necessary for power generation. The first threshold and the first period are determined by experiment or simulation and stored in the memory of the control device 20. The first threshold is, for example, a value of 5 kPa or more. The first period is, for example, a period of 5 cycles when a time from valve opening to next valve opening of the injector 55 is set to one cycle. It is considered that the anode gas shortage state may occur in a state where the discharge amount of the gas from the discharge valve 63 is large with respect to the supply amount of the anode gas. Normally, the anode gas supply device is configured such that the maximum supply amount of the anode gas by the anode gas supply device is the supply amount necessary at the time of the output upper limit of the fuel cell stack 10. This is because the cost in the fuel cell system 100 can be reduced as compared to when the anode gas supply device is configured such that the supply amount is sufficiently larger than the supply amount necessary at the time of the output upper limit of the fuel cell stack 10. Thus, when the discharge amount of the gas from the discharge valve 63 is excessively large with respect to the supply amount of the anode gas, the anode gas shortage state may occur.

When the pressure deviation equal to or larger than the first threshold has not continued for the first period (NO at step S30), the control unit 21 determines whether the first valve closing condition is established in which the anode gas concentration estimated by the estimation unit 23 is equal to or more than a second concentration higher than the first concentration (step S40). The second concentration is determined in advance by experiment or simulation, and stored in the memory of the control device 20.

When the first valve closing condition is established (YES at step S40), the control unit 21 closes the discharge valve 63 (step S50), and returns the processing to step S10. When the first valve closing condition is not established (NO at step S40), the control unit 21 repeats determination of step S30 and step S40. The control of step S10, step S20, step S40, and step S50 by the control unit 21 is also referred to as "first control".

When the pressure deviation equal to or more than the first threshold has continued for the first period (YES at step S30), the control unit 21 closes the discharge valve 63 (step S60).

After the determination as YES at step S30 is made and the discharge valve 63 is closed, the control unit 21 determines whether the second valve opening condition is established (step S70).

The second valve opening condition is that (i) the anode gas concentration is equal to or lower than a third concentration lower than the first concentration, or (ii) a modified estimated anode gas concentration is equal to or lower than the first concentration. The modified estimated anode gas concentration is a value that is obtained by multiplying the estimated anode gas concentration by a predetermined coefficient so that the anode gas concentration is estimated to be high. The predetermined coefficient is, for example, a value of 1.2 or more and 1.8 or less.

The reason why closing of the discharge valve 63 can be maintained until when the anode gas concentration becomes equal to or lower than the third concentration lower than the first concentration as (i) described above is as follows. At the time of high load, the temperature of the fuel cell stack 10 is relatively high, the water content of each fuel cell 11 decreases, and the amount of water inhibiting gas flowing through the fuel cell stack 10 becomes small. Thus a pressure loss variation in each fuel cell 11 composing the fuel cell stack 10 becomes small. Therefore, the necessary anode gas stoichiometric ratio can be made smaller than that at the time of non-high load power generation. As a result, closing of the discharge valve 63 can be maintained until when the anode gas concentration becomes equal to or lower than the third concentration lower than the first concentration.

The reason why closing of the discharge valve 63 can be maintained until when the modified estimated anode gas concentration is equal to or lower than the first concentration as (ii) described above is as follows. At the time of high load, the temperature of the fuel cell stack 10 is relatively high, and the water amount discharged from the discharge valve 63 is smaller than at the time of non-high load. Thus, the anode off-gas is discharged more than that estimated from the discharge valve 63 and impurities in the anode off-gas are also discharged more. Therefore the anode gas concentration can be estimated to be higher than that at the non-high load power generation. As a result, closing of the discharge valve 63 can be maintained until when the modified estimated anode gas concentration is equal to or lower than the first concentration.

When the second valve opening condition is established (YES at step S70), the control unit 21 opens the discharge valve 63 (step S80). The control of step S60, step S70, and step S80 by the control unit 21 is also referred to as "second control". After the second valve opening condition is established and the discharge valve 63 is opened, the control unit 21 returns the processing to the first control (step S10). As described above, the opening and closing processing of the discharge valve 63 by the control unit 21 is performed.

Figure 3:
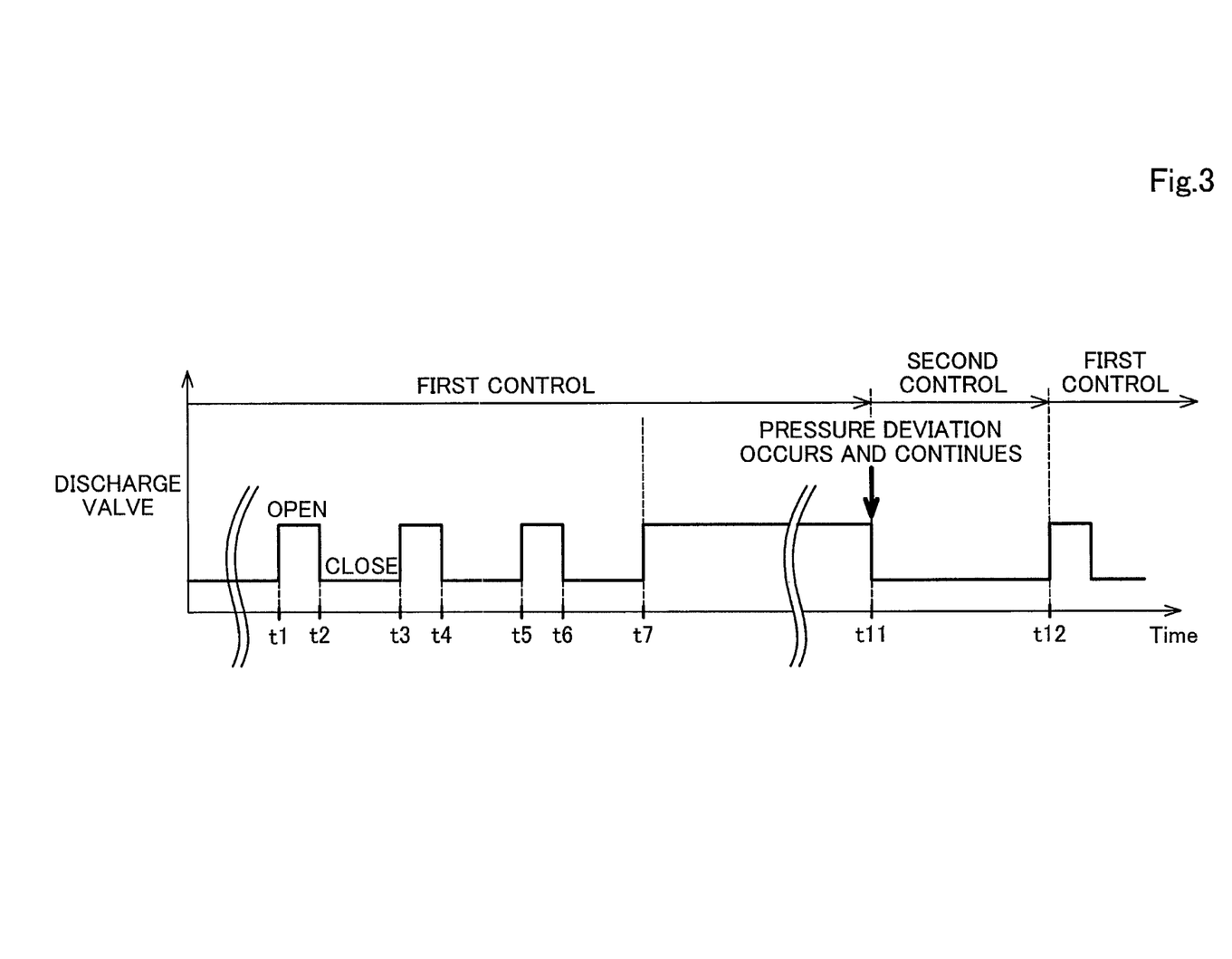
FIG. 3 is a diagram representing an opening and closing timing of the discharge valve.

FIG. 3 is a diagram representing an opening and closing timing of the discharge valve 63 in the opening and closing processing of the discharge valve 63. The period until the time point t11 is a period in which the discharge valve 63 is opened or closed by the first control. The time point t1, time point t3, time point t5, and time point t7 are time points in which the first valve opening condition is established, and the time point t2, time point t4, and time point t6 are time points in which the first valve closing condition is established. Until the time point t7, the fuel cell stack 10 performs non-high load power generation, and the discharge valve 63 is intermittently opened or closed. After the time point t7 has elapsed, the opening state of the discharge valve 63 continues. This is because, by the high load power generation, the anode gas supply amount is insufficient and the first valve closing condition in which the estimated anode gas concentration is equal to or higher than the second concentration is hard to be established, and the discharge request of the anode off-gas continues.

The time point t11 is a time point in which determination as YES at step S30 is made, and the control proceeds to the second control from the time point t11, so that the discharge valve 63 is closed. The time point t12 is a time point in which the second valve opening condition is established, and after the time point t12 has elapsed, the discharge valve 63 is opened or closed again by the first control. In the second control, as described above, valve closing is allowed until the following condition is satisfied, that is, (i) the anode gas concentration is equal to or lower than a third concentration lower than the first concentration in the first control, or (ii) the value obtained by multiplying the estimated anode gas concentration by a predetermined coefficient so that the anode gas concentration is estimated to be high is equal to or lower than the first concentration in the first control. As a result, the valve closing time (t11 to t12) in the second control is longer than the valve closing time (t2 to t3, t4 to t5, t6 to t7) in the first control.

When the pressure deviation is continuously equal to or larger than the predetermined threshold for the predetermined period, it is considered that the fuel cell is in the anode gas shortage condition in which the amount of the supplied anode gas is insufficient with respect to the amount necessary for power generation. According to this embodiment, when the anode gas shortage state is established, the discharge valve 63 is closed, so that the anode gas shortage state can be solved. The anode gas shortage state may occur in a state where the amount of gas discharged from the discharge valve 63 is large, with respect to the supply amount of the anode gas. When the condition in which the estimated anode gas concentration is equal to or higher than the second concentration higher than the first concentration is hard to be established, for example, when the fuel cell performs high load power generation, the amount of the gas discharged from the discharge valve 63 is large. When the high load power generation is performed, it is considered that impurity gas inhibiting power generation of the fuel cell stack 10 is discharged from the discharge valve 63 more than estimated. Thus, the remaining force for storing the anode off-gas in the fuel cell is large, so that the period from when the discharge valve 63 is closed to when the discharge valve 63 is opened can be longer than that in the first control, by opening the discharge valve 63 when the estimated anode gas concentration is equal to or lower than the third concentration lower than the first concentration, or opening the discharge valve 63 when the value obtained by multiplying the estimated anode gas concentration by a predetermined coefficient so that the anode gas concentration is estimated to be high is equal to or lower than the first concentration. As a result, the amount of the anode gas discharged from the discharge valve 63 can be made small.

Second Embodiment

Figure 4:
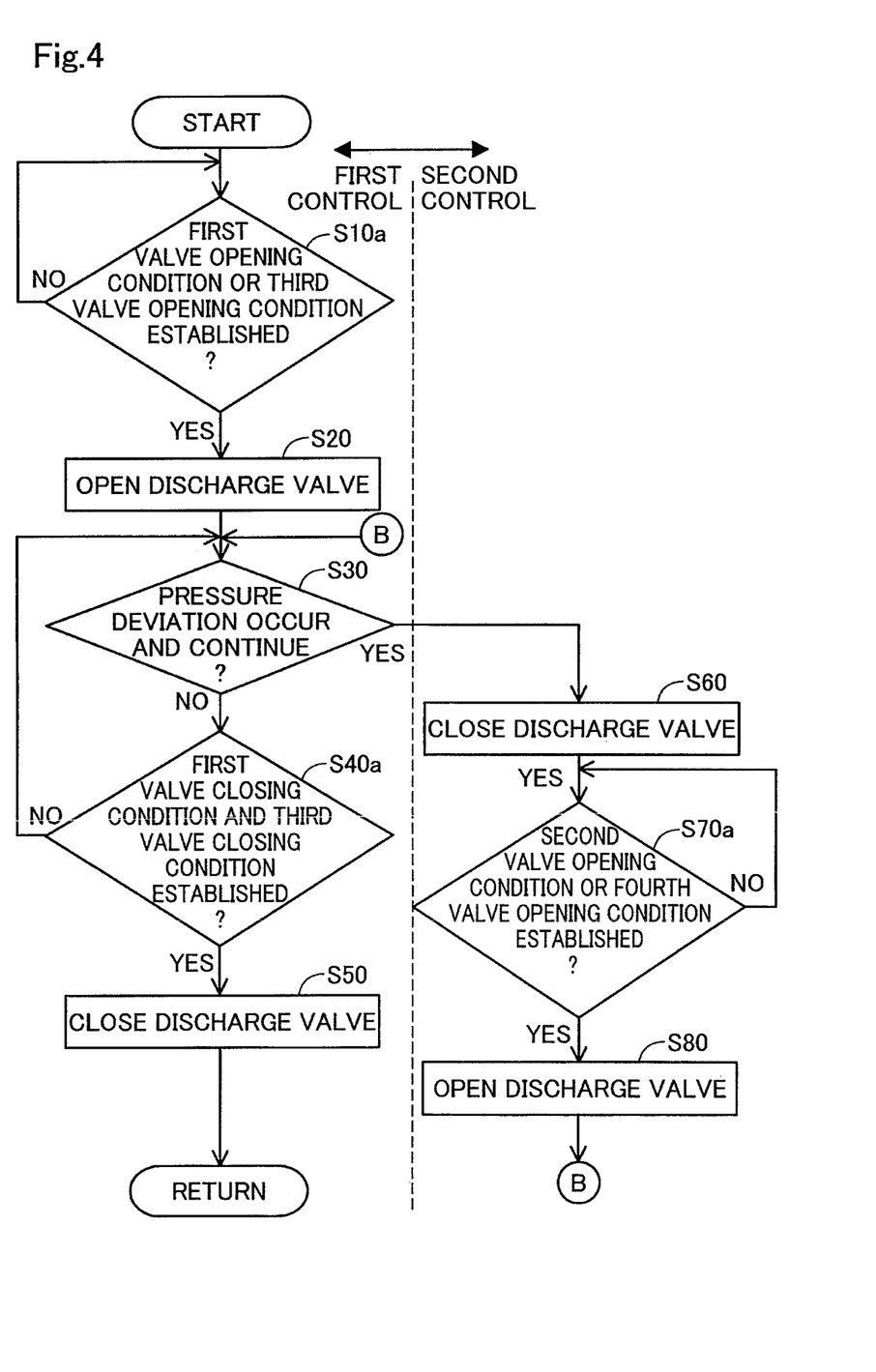
FIG. 4 is a process diagram showing opening and closing processing of the discharge valve in a second embodiment.

FIG. 4 is a process diagram showing opening and closing processing of the discharge valve 63 in a second embodiment. In FIG. 4, the same reference numerals are given for the same processing as the opening and closing processing (FIG. 2) of the first embodiment. When the first valve opening condition related to the anode gas concentration is established, or when the third valve opening condition is established in which the water amount estimated by the estimation unit 23 is equal to or larger than the first water amount, the control unit 21 opens the discharge valve 63 (step S10a).

When the first valve closing condition related to the anode gas concentration and the third valve closing condition in which the estimated water amount is equal to or smaller than the second water amount smaller than the first water amount are established, the control unit 21 closes the discharge valve 63 (step S40a). The second water amount may be an amount of when discharging of water in the gas and liquid separation device 62 is completed.

The control unit 21 determines, in the second control, whether the second valve opening condition related to the anode gas concentration is established, or whether the fourth valve opening condition described below is established (step S70a), and when the second valve opening condition or the fourth valve opening condition is established, opens the discharge valve 63 (step S80).

The fourth valve opening condition is that (iii) the estimated water amount in the gas and liquid separation device 62 is equal to or larger than the third water amount larger than the first water amount, or (iv) a value obtained by multiplying the estimated water amount in the gas and liquid separation device 62 by a predetermined coefficient so that the water amount is estimated to be small is equal to or larger than the first water amount. The predetermined coefficient is, for example, 0.05 to 0.70.

As (iii) described above, it is considered that, closing of the discharge valve 63 can be maintained until the estimated water amount becomes equal to or larger than the third water amount larger than the first water amount, since the temperature of the fuel cell stack 10 is relatively high and the amount of crossover water decreases at the time of high load, and the amount of water steam included in the anode off-gas also decreases, so that the water amount in the gas and liquid separation device 62 decreases. As (iv) described above, closing of the discharge valve can be maintained until the value obtained by estimating the water amount to be small becomes equal to or larger than the first water amount, for the similar reason to (iii) described above.

According to this embodiment, it is considered that, when the pressure deviation is continuously equal to or larger than the predetermined threshold for a predetermined period, the high load power generation is performed, and the fuel cell has high temperature, so that the water amount in the gas and liquid separation device 62 is smaller than estimated. Thus, the period from when the discharge valve 63 is closed to when the discharge valve 63 is opened can be made longer than at the time of the first control by opening the discharge valve 63 when the estimated water amount is equal to or larger than the third water amount larger than the first water amount, or opening the discharge valve 63 when the value obtained by multiplying the estimated water amount by a predetermined coefficient so that the water amount is estimated to be small is equal to or larger than the first water amount. As a result, the anode gas amount discharged from the discharge valve 63 can be made small.

Other Embodiment 1

After the discharge valve 63 is closed in step S60 in the opening and closing processing, and before determination of step S70 and step S70a, when the pressure deviation is continuously equal to or smaller than the predetermined second threshold for the second period or more, the control unit 21 may open the discharge valve 63 (step S80), and return the processing to the first control. The second threshold and the second period are a threshold and a period with which the solving of the anode gas shortage state can be determined, and can be determined in advance by experiment or simulation. The second threshold is, for example, a value equal to or smaller than 1 kPa. The second period is, for example, a period for five cycles of the injector 55. According to this embodiment, when the anode gas shortage state is sufficiently solved, the control can be returned from the second control to the first control so that the opening and closing processing of the discharge valve 63 is performed.

Other Embodiment 2

In the embodiment described above, a relationship among the rotation speed of the anode gas pump 65, the anode gas concentration, and the water amount in the gas and liquid separation device 62 may be stored in advance in the memory of the control device 20, and the estimation unit 23 may estimate the anode gas concentration and the water amount in the gas and liquid separation device 62 in consideration of the rotation speed of the anode gas pump 65.

Other Embodiment 3

The fuel cell system 100 may not be equipped in the vehicle 110, and may be a stationary type.

The present disclosure is not limited to the embodiments described above, and can be performed in various configurations without departing from the spirit of the present disclosure. For example, the embodiments corresponding to the technical features in each embodiment, and the technical features in other embodiments may be changed or combined as appropriate, in order to solve a part or all of the problem described above, or achieve a part or all of the effects described above. The technical features can be deleted as appropriate, if the technical features are not described in this specification as essential. The present disclosure may be implemented by aspects described below.

(1) According to a first aspect of the present disclosure, a fuel cell system is provided. This fuel cell system is a fuel system including: a fuel cell; an anode gas supply device provided in a supply flow path that supplies anode gas to the fuel cell; a pressure sensor that measures a pressure value of the supply flow path in a downstream of the anode gas supply device; a discharge valve provided in a discharge flow path through which anode off-gas is discharged from the fuel cell; an estimation unit configured to estimate an anode gas concentration of the supply flow path in the downstream of the anode gas supply device, using an anode gas supply amount by the anode gas supply device and a discharge amount of the anode off-gas obtained by using a valve opening time of the discharge valve; and a control unit configured to perform opening and closing of the discharge valve and controlling the anode gas supply device such that a value measured by the pressure sensor is a target pressure value, and in the fuel cell system, the control unit configured to perform first control of opening the discharge valve when a first valve opening condition is established in which the anode gas concentration estimated by the estimation unit is equal to or lower than a first concentration, and closing the discharge valve when a first valve closing condition is established in which the estimated anode gas concentration is equal to or higher than a second concentration higher than the first concentration, and the control unit configured to perform second control of closing the discharge valve when a deviation between the target pressure value and a value of the pressure sensor is continuously equal to or larger than a predetermined threshold for a predetermined period, and opening the discharge value when a second valve opening condition is established in which the estimated anode gas concentration is equal to or lower than a third concentration lower than the first concentration, or a value obtained by multiplying the estimated anode gas concentration by a predetermined coefficient so that the anode gas concentration is estimated to be high is equal to or lower than the first concentration.

When the deviation is continuously equal to or larger than the predetermined threshold for the predetermined period, it can be considered that the fuel cell is in an anode gas shortage state in which the amount of the supplied anode gas is insufficient with respect to a necessary amount for power generation. According to this aspect, the discharge valve is closed in the case of the anode gas shortage state, so that the anode gas shortage state can be solved. The anode gas shortage state may be generated in a state where the discharge amount of the gas from the discharge valve is large with respect to the supply amount of the anode gas. When the condition in which the estimated anode gas concentration is equal to or higher than the second concentration higher than the first concentration is difficult to be established, for example, the discharge of the gas from the discharge valve is large when the fuel cell performs high load power generation, and it is considered that when the high load power generation is performed, impurity gas that inhibits power generation of the fuel cell is discharged from the discharge valve more than estimated. Thus, since a remaining force of accumulating the anode off-gas in the fuel cell is large, when the estimated anode gas concentration is equal to or lower than the third concentration lower than the first concentration, or when the value obtained by multiplying the estimated anode gas concentration by a predetermined coefficient so that the anode gas concentration is estimated to be high is equal to or lower than the first concentration, the discharge valve is opened so that the period from closing of the discharge valve to opening of the discharge valve can be longer than at the time of the first control. As a result, the amount of the anode gas discharged from the discharge valve can be made small.

(2) In the aspect described above, the fuel cell system may further include a gas and liquid separation device configured to store water contained in the anode off-gas discharged from the fuel cell stack, the estimation unit may estimate a water amount in the gas and liquid separation device by using a power generation amount of the fuel cell stack, the control unit, in the first control, may open the discharge valve when a third valve opening condition is established in which the water amount estimated by the estimation unit is equal to or larger than a first water amount, and close the discharge valve when the first valve closing condition and a third valve closing condition in which the estimated water amount is equal to or smaller than a second water amount smaller than the first water amount are established, and the control unit, in the second control, may open the discharge valve when a fourth valve opening condition is established in which the estimated water amount is equal to or larger than a third water amount larger than the first water amount, or a value obtained by multiplying the estimated water amount by a predetermined coefficient so that the water amount is estimated to be small is equal to or larger than the first water amount.

According to this aspect, when the deviation is continuously equal to or larger than the predetermined threshold for the predetermined period, high load power generation is performed and the fuel cell has high temperature, so that it is considered that the water amount in the gas and liquid separation device is smaller than estimated. Thus, the discharge valve is opened when the estimated water amount is equal to or larger than the third water amount larger than the first water amount, or the discharge valve is opened when the value obtained by multiplying the estimated water amount by a predetermined coefficient so that the water amount is estimated to be small, is equal to or larger than the first water amount, so that the period from closing of the discharge valve to opening of the discharge valve can be made longer than at the time of the first control. As a result, the amount of the anode gas discharged from the discharge valve can be made small.

(3) According to a second aspect of the present disclosure, a control method of a fuel cell system is provided. This method is a method including: estimating an anode gas concentration of a supply flow path in a downstream of an anode gas supply device provided in the supply flow path that supplies anode gas to a fuel cell by using an anode gas supply amount by the anode gas supply device and a discharge amount of anode off-gas determined by using a valve opening time of a discharge valve provided in a discharge flow path through which the anode off-gas is discharged from the fuel cell; controlling the anode gas supply device such that a pressure value of the supply flow path in the downstream of the anode gas supply device is a target pressure value; performing first control of opening the discharge valve when a first opening condition is established in which the estimated anode gas concentration is equal to or lower than a first concentration, and closing the discharge valve when a first valve closing condition is established in which the estimated anode gas concentration is equal to or higher than a second concentration higher than the first concentration; and performing second control of closing the discharge valve when a deviation between the target pressure value and the pressure value of the supply flow path in the downstream of the anode gas supply device is continuously equal to or larger than a predetermined threshold for a predetermined period, and opening the discharge valve when a second valve opening condition is established in which the estimated anode gas concentration is equal to or lower than a third concentration lower than the first concentration, or a value obtained by multiplying the estimated anode gas concentration by a predetermined coefficient so that the anode gas concentration is estimated to be high is equal to or lower than the first concentration.

(4) In the method of the aspect described above, the method may further include: estimating a water amount in a gas and liquid separation device that stores water in the anode off-gas discharged from the fuel cell by using a power generation amount of the fuel cell; in the first control, opening the discharge valve when a third valve opening condition is established in which the estimated water amount is equal to or larger than a first water amount, and closing the discharge valve when the first valve closing condition or the third valve closing condition in which the estimated water amount is equal to or smaller than a second water amount smaller than the first water amount is established; and in the second control, opening the discharge valve when a fourth valve opening condition is established in which the estimated water amount is equal to or larger than a third water amount larger than the first water amount, or a value obtained by multiplying the estimated water amount by a predetermined coefficient so that a water amount is estimated to be small is equal to or larger than the first water amount.

The present disclosure can be realized in various aspects. For example, the present disclosure can be realized in aspects such as a control method of a fuel cell system, a control method of a fuel cell vehicle, a computer program that realizes the control method, a non-transitory storage medium in which the computer program is recorded, or the like.

What is claimed is:
1. A fuel cell system comprising:
a fuel cell;
an anode gas supply device provided in a supply flow path that supplies anode gas to the fuel cell;
a pressure sensor that measures a pressure value of the supply flow path in a downstream of the anode gas supply device;
a discharge valve provided in a discharge flow path through which anode off-gas is discharged from the fuel cell;
an estimation unit configured to estimate an anode gas concentration of the supply flow path in the downstream of the anode gas supply device, using an anode gas supply amount by the anode gas supply device and a discharge amount of the anode off-gas obtained by using a valve opening time of the discharge valve; and
a control unit configured to perform opening and closing of the discharge valve and controlling the anode gas supply device such that a value measured by the pressure sensor is equal to or greater than a target pressure value, wherein the control unit is configured to perform:

opening the discharge valve when a first valve opening condition is established in which the estimated anode gas concentration is equal to or lower than a first concentration, closing the discharge valve when a deviation between the target pressure value and a value of the pressure sensor is not continuously equal to or larger than a predetermined threshold for a predetermined period and a first valve closing condition is established in which the estimated anode gas concentration is equal to or higher than a second concentration higher than the first concentration, and closing the discharge valve when the deviation between the target pressure value and the value of the pressure sensor is continuously equal to or larger than the predetermined threshold for the predetermined period and opening the discharge valve when a second valve opening condition is established in which the estimated anode gas concentration is equal to or lower than a third concentration lower than the first concentration, or a value obtained by multiplying the estimated anode gas concentration by a predetermined coefficient so that the anode gas concentration is estimated to be high is equal to or lower than the first concentration.

2. A fuel cell system comprising:

a fuel cell:

an anode gas supply device provided in a supply flow path that supplies anode gas to the fuel cell;

a pressure sensor that measures a pressure value of the supply flow path in a downstream of the anode gas supply device;

a discharge valve provided in a discharge flow path through which anode off-gas is discharged from the fuel cell;

a gas and liquid separation device configured to store water contained in the anode off-gas discharged from the fuel cell;

an estimation unit configured to estimate an anode gas concentration of the supply flow path in the downstream of the anode gas supply device, using an anode gas supply amount by the anode gas supply device and a discharge amount of the anode off-gas obtained by using a valve opening time of the discharge valve, wherein the estimation unit is further configured to estimate a water amount in the gas and liquid separation device by using a power generation amount of the fuel cell; and a control unit configured to perform opening and closing of the discharge valve and controlling the anode gas supply device such that a value measured by the pressure sensor is equal to or greater than a target pressure value, wherein the control unit is configured to perform:

opening the discharge valve when a first valve opening condition or a third valve opening condition is established, the first valve opening condition being a condition in which the estimated anode gas concentration is equal to or lower than a first concentration and the third valve opening condition being a condition in which the water amount estimated by the estimation unit is equal to or larger than a first water amount, closing the discharge valve when a deviation between the target pressure value and a value of the pressure sensor is not continuously equal to or larger than a predetermined threshold for a predetermined period and a first valve closing condition and a third valve closing condition are established, the first valve closing condition being a condition in which the estimated anode gas concentration is equal to or higher than a second concentration higher than the first concentration, and the third valve closing condition being a condition in which the estimated water amount is equal to or smaller than a second water amount that is smaller than the first water amount, and closing the discharge valve when the deviation between the target pressure value and the value of the pressure sensor is continuously equal to or larger than the predetermined threshold for the predetermined period and opening the discharge valve when a second valve opening condition or a fourth valve opening condition is established, the second valve opening condition being a condition in which the estimated anode gas concentration is equal to or lower than a third concentration lower than the first concentration, or a value obtained by multiplying the estimated anode gas concentration by a predetermined coefficient so that the anode gas concentration is estimated to be high is equal to or lower than the first concentration, and the fourth valve opening condition being a condition in which the estimated water amount is equal to or larger than a third water amount larger than the first water amount, or a value obtained by multiplying the estimated water amount by a predetermined coefficient so that the water amount is estimated to be small is equal to or larger than the first water amount.

* * * * *